United States Patent
He

(10) Patent No.: US 10,856,247 B2
(45) Date of Patent: *Dec. 1, 2020

(54) TRANSMISSION TIMING ADJUSTMENT METHOD AND DEVICE

(71) Applicant: HUAWEI TECHNOLOGIES CO., LTD., Shenzhen, Guangdong (CN)

(72) Inventor: Enhua He, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/660,353

(22) Filed: Oct. 22, 2019

(65) Prior Publication Data

US 2020/0053684 A1 Feb. 13, 2020

Related U.S. Application Data

(63) Continuation of application No. 16/225,770, filed on Dec. 19, 2018, now Pat. No. 10,484,956, which is a
(Continued)

(51) Int. Cl.
*H04W 56/00* (2009.01)
*H04W 24/02* (2009.01)
(Continued)

(52) U.S. Cl.
CPC ....... *H04W 56/0045* (2013.01); *H04W 24/02* (2013.01); *H04W 56/00* (2013.01); *H04W 72/0413* (2013.01); *H04W 74/0833* (2013.01)

(58) Field of Classification Search
CPC . H04W 56/0045; H04W 24/02; H04W 56/00; H04W 72/0413; H04W 74/0833
(Continued)

(56) References Cited

U.S. PATENT DOCUMENTS 8,743,748 B2 6/2014 Pan et al.
10,194,413 B2 * 1/2019 He ................... H04W 56/00
(Continued)

FOREIGN PATENT DOCUMENTS

CN 101541071 A 9/2009
CN 101841778 A 9/2010
(Continued)

OTHER PUBLICATIONS

3GPP TS 36.211 V123.0 (Sep. 2014), "3rd Generation Partnership Project; Technical Specification Group Radio Access Network; Evolved Universal Terrestrial Radio Access (E-UTRA); Physical channels and modulation (Release 12)," Sep. 2014, pp. 1-124.
(Continued)

*Primary Examiner* — Michael R Neff
(74) *Attorney, Agent, or Firm* — Fish & Richardson P.C.

(57) ABSTRACT

A transmission timing adjustment method and device are provided. The method includes: determining, by a base station, a transmission delay between user equipment (UE) and the base station; generating, a timing advance (TA) quantized value according to the transmission delay, where the TA quantized value includes a base value and an offset value, quantization precision of the base value is first quantization precision MTs, quantization precision of the offset value is second quantization precision NTs, M is a positive integer less than or equal to 16, N is a nonnegative integer less than M, and Ts is a minimum time unit in a LTE system and has a value of 1/30.72 μs; and sending, by the base station, the TA quantized value to the UE, where the TA quantized value is used for uplink transmission timing adjustment of the UE. The embodiments facilitate network planning and optimization.

29 Claims, 7 Drawing Sheets

Related U.S. Application Data continuation of application No. 15/471,417, filed on Mar. 28, 2017, now Pat. No. 10,194,413, which is a continuation of application No. PCT/CN2014/087962, filed on Sep. 30, 2014.

(51) Int. Cl.
*H04W 72/04* (2009.01)
*H04W 74/08* (2009.01)

(58) Field of Classification Search
USPC .......................................................... 375/355
See application file for complete search history.

(56) References Cited

U.S. PATENT DOCUMENTS

| | | | |
|---|---|---|---|
| 2009/0232113 | A1 | 9/2009 | Tamaki |
| 2012/0115539 | A1 | 5/2012 | Zhang et al. |
| 2013/0279435 | A1* | 10/2013 | Dinan ................. H04W 52/146 370/329 |
| 2014/0179331 | A1 | 6/2014 | Futaki et al. |
| 2015/0085839 | A1 | 3/2015 | Bergstrom et al. |
| 2019/0124615 | A1* | 4/2019 | He ........................ H04W 56/00 |

FOREIGN PATENT DOCUMENTS

| | | |
|---|---|---|
| CN | 101185270 B | 10/2010 |
| CN | 102065535 A | 5/2011 |
| CN | 102752846 A | 10/2012 |
| CN | 102833844 A | 12/2012 |
| CN | 103733699 A | 4/2014 |
| EP | 1887716 A1 | 2/2008 |
| EP | 2282468 A1 | 2/2011 |
| JP | 2008283242 A | 11/2008 |
| WO | WO2013050083 A1 | 4/2013 |
| WO | WO2014051713 A1 | 4/2014 |
| WO | WO2014113995 A1 | 7/2014 |

OTHER PUBLICATIONS

3GPP TS 36.321 V12.3.0 (Sep. 2014), "3rd Generation Partnership Project; Technical Specification Group Radio Access Network; Evolved Universal Terrestrial Radio Access (E-UTRA); Medium Access Control (MAC) protocol specification • (Release 12)," Sep. 2014, pp. 1-57.

3GPP TS 36.213 V12.3.0 (Sep. 2014), "3rd Generation Partnership Project; Technical Specification Group Radio Access Network; Evolved Universal Terrestrial Radio Access (E-UTRA); Physical layer procedures (Release 12), " Sep. 2014, pp. 1-212.

3GPP TSG RAN WG1 Meeting #78 R1-142870, "On D2D scheduling assignment content and physical structure," Intel Corporation, Aug. 18-24, 2014 (12 pp.).

Extended European Search Report, dated Aug. 21, 2017, in European Application No. 14902934.0 (6 pp.).

Final Office Action, dated May 18, 2018, in U.S. Appl. No. 15/471,417 (10 pp.).

International Search Report, dated Jul. 1, 2015, in International Application No. PCT/CN2014/087962 (8 pp.).

Notice of Allowance, dated Sep. 12, 2018, in U.S. Appl. No. 15/471,417 (7 pp.).

Office Action, dated Aug. 31, 2018, in Chinese Application No. 201480035193.2 (5 pp.).

Office Action, dated Dec. 19, 2017, in U.S. Appl. No. 15/471,417 (28 pp.).

\* cited by examiner

TRANSMISSION TIMING ADJUSTMENT METHOD AND DEVICE

CROSS-REFERENCE TO RELATED APPLICATIONS

This application is a continuation of U.S. patent application Ser. No. 16/225,770, filed on Dec. 19, 2018, which is a continuation of U.S. patent application Ser. No. 15/471,417, filed on Mar. 28, 2017, now U.S. Pat. No. 10,194,413. which is a continuation of International Application No. PCT/CN2014/087962, filed on Sep. 30, 2014. All of the aforementioned patent applications are hereby incorporated by reference in their entireties.

TECHNICAL FIELD

Embodiments of the present invention relate to communications technologies, and in particular, to a transmission timing adjustment method and device.

BACKGROUND

In a Long Term Evolution (LTE) system of the 3rd Generation Partnership Project (3GPP), each user equipment (UE) uses a single-carrier frequency division multiple access transmission technology in an uplink direction. To ensure orthogonality between uplink signals of UEs, the uplink signals of the UEs need to arrive at a receive end of a base station at a same time, that is, uplink synchronization is needed.

The UE may ensure uplink synchronization by using a random access process. In the random access process, the UE sends a random access preamble to the base station. After receiving and detecting the random access preamble, the base station sends a random access response to the UE. The random access response includes a timing advance command, so that the UE performs transmission timing adjustment according to the timing advance command. The UE adjusts uplink transmission timing of a physical uplink control channel (PUCCH), a physical uplink shared channel (PUSCH), and a sounding reference signal (SRS) according to the timing advance command.

With development of a self-organizing network (SON), the transmission timing adjustment may further be applied to network planning and optimization. For example, the base station may analyze signal quality and UE distribution in different areas according to information reported by the UEs in measurement reports and according to timing advance (TA) information of the UEs, thereby learning information about coverage and traffic of a station, and determining whether a macro base station or a micro base station needs to be added to an area with poor coverage or high traffic or whether an antenna angle of the station needs to be adjusted. However, a current transmission timing adjustment mechanism has an adverse impact on accuracy of network planning and optimization.

SUMMARY

Embodiments of the present invention provide a transmission timing adjustment method and device, so that transmission timing adjustment is more beneficial to network planning and optimization.

According to a first aspect, the present invention provides a transmission timing adjustment method, including:

determining, by a base station, a transmission delay between user equipment UE and the base station;

generating, by the base station, a timing advance TA quantized value according to the transmission delay, where the TA quantized value includes a base value and an offset value, quantization precision of the base value is first quantization precision $MT_s$, quantization precision of the offset value is second quantization precision $NT_s$, M is a positive integer less than or equal to 16, N is a nonnegative integer less than M, and $T_s$ is a minimum time unit in a Long Term Evolution (LTE) system and has a value of 1/30.72 µs; and sending, by the base station, the TA quantized value to the UE, where the TA quantized value is used for uplink transmission timing adjustment of the UE.

With reference to the first aspect, in a first possible implementation manner of the first aspect, M is equal to 16, and N is less than 16.

With reference to the first possible implementation manner of the first aspect, in a second possible implementation manner of the first aspect, N is 1, 2, 4, or 8.

With reference to the first or the second possible implementation manner of the first aspect, in a third possible implementation manner of the first aspect, the generating, by the base station, a TA quantized value according to the transmission delay includes:

quantizing the transmission delay by using the first quantization precision $MT_s$, to obtain a quantized value and a remainder of the transmission delay, where the quantized value of the transmission delay is the base value; and quantizing the remainder by using the second quantization precision $NT_s$, to obtain a quantized value of the remainder, where the quantized value of the remainder is the offset value.

With reference to the first or the second possible implementation manner of the first aspect, in a fourth possible implementation manner of the first aspect, when N is 1, the generating, by the base station, a TA quantized value according to the transmission delay includes:

quantizing the transmission delay by using the second quantization precision $NT_s$, to obtain an intermediate quantized value; and performing a modulo-16 operation on the intermediate quantized value, and performing rounding to obtain the base value, where a remainder is used as the offset value.

With reference to any one of the first to the fourth possible implementation manners of the first aspect, in a fifth possible implementation manner of the first aspect, during random access, the base value occupies 11 bits, and the offset value occupies 4 bits; or during non-random access, the base value occupies 6 bits, and the offset value occupies 4 bits.

With reference to the first aspect, in a sixth possible implementation manner of the first aspect, M is less than 16, N is 0, and the generating, by the base station, a TA quantized value according to the transmission delay includes:

quantizing the transmission delay by using the first quantization precision $MT_s$, to obtain the quantized value of the transmission delay, where the quantized value of the transmission delay is the TA quantized value.

With reference to the sixth possible implementation manner of the first aspect, in a seventh possible implementation manner of the first aspect, M is 1, 2, 4, or 8.

With reference to any one of the first aspect or the first to the seventh possible implementation manners of the first aspects, in an eighth possible implementation manner of the first aspect, the transmission delay is a timing advance $T_{ADV}$, where during random access, $T_{ADV}$=(eNB Rx-Tx time difference); or during non-random access, $T_{ADV}$=(eNB Rx-Tx time difference)+(UE Rx-Tx time difference), where the "eNB Rx-Tx time difference" represents a difference between a receiving time and a transmitting time of the base station, and the "UE Rx-Tx time difference" represents a difference between a receiving time and a transmitting time of the UE.

With reference to any one of the first aspect or the first to the eighth possible implementation manners of the first aspect, in a ninth possible implementation manner of the first aspect, the base station sends the TA quantized value by using a TA command.

With reference to any one of the first aspect or the first to the ninth possible implementation manners of the first aspect, in a tenth possible implementation manner of the first aspect, the method further includes:

receiving a measurement report and call information that are sent by the UE;

determining network coverage information and traffic information according to the TA quantized value, the measurement report, and the call information; and performing network planning or optimization according to the network coverage information and the traffic information.

According to a second aspect, an embodiment of the present invention provides a transmission timing adjustment method, including:

receiving, by user equipment UE, a timing advance TA quantized value sent by a base station, where the TA quantized value includes a base value and an offset value, quantization precision of the base value is first quantization precision MTs, quantization precision of the offset value is second quantization precision NTs, M is a positive integer less than or equal to 16, N is a nonnegative integer less than M, and Ts is a minimum time unit in a Long Term Evolution (LTE) system and has a value of 1/30.72 μs;

determining, by the UE, a transmission timing adjustment amount according to the TA quantized value; and performing, by the UE, uplink transmission timing adjustment according to the transmission timing adjustment amount.

With reference to the second aspect, in a first possible implementation manner of the second aspect, M is equal to 16, and N is less than 16.

With reference to the first possible implementation manner of the second aspect, in a second possible implementation manner of the second aspect, N is 1, 2, 4, or 8.

With reference to the first or the second possible implementation manner of the second aspect, in a third possible implementation manner of the second aspect, during random access, the base value occupies 11 bits, and the offset value occupies 4 bits; or during non-random access, the base value occupies 6 bits, and the offset value occupies 4 bits.

With reference to any one of the first to the third possible implementation manners of the second aspect, in a fourth possible implementation manner of the second aspect, during random access, the transmission timing adjustment amount is $N_{TA}$, $N_{TA}=T_{A\_BASE}*M+T_{A\_OFFSET}*N$, a unit of $N_{TA}$ is Ts, $T_{A\_BASE}$ is the base value, and $T_{A\_OFFSET}$ is the offset value; or during non-random access, the transmission timing adjustment amount is $N_{TA,new}$, $N_{TA,new}=N_{TA,old}+(T_{A\_BASE}-m)*M+T_{A\_OFFSET}*N$, a unit of $N_{TA,new}$ is Ts, $N_{TA,old}$ is a previous transmission timing adjustment amount, $T_{A\_BASE}$ is the base value, $T_{A\_OFFSET}$ is the offset value, m is [a maximum value of $T_{A\_BASE}/2$], and [ ] represents rounding up or rounding down.

With reference to the second aspect, in a fifth possible implementation manner of the second aspect, M is less than 16, N is 0, and the TA quantized value is the base value.

With reference to the fifth possible implementation manner of the second aspect, in a sixth possible implementation manner of the second aspect, M is 1, 2, 4, or 8.

With reference to any one of the second aspect or the first to the sixth possible implementation manners of the second aspect, in a seventh possible implementation manner of the second aspect, the UE receives the TA quantized value by using a TA command.

With reference to any one of the second aspect or the first to the seventh possible implementation manners of the second aspect, in an eighth possible implementation manner of the second aspect, the method further includes:

sending a measurement report and call information to the base station, so that the base station determines network coverage information and traffic information according to the TA quantized value, the measurement report, and the call information.

According to a third aspect, the present invention provides a base station, including:

a delay determining module, configured to determine a transmission delay between user equipment UE and the base station;

a quantized-value generation module, configured to generate a timing advance TA quantized value according to the transmission delay, where the TA quantized value includes a base value and an offset value, quantization precision of the base value is first quantization precision MTs, quantization precision of the offset value is second quantization precision NTs, M is a positive integer less than or equal to 16, N is a nonnegative integer less than M, and Ts is a minimum time unit in a Long Term Evolution (LTE) system and has a value of 1/30.72 μs; and a sending module, configured to send the TA quantized value to the UE, where the TA quantized value is used for uplink transmission timing adjustment of the UE.

With reference to the third aspect, in a first possible implementation manner of the third aspect, M is equal to 16, and N is less than 16.

With reference to the first possible implementation manner of the third aspect, in a second possible implementation manner of the third aspect, N is 1, 2, 4, or 8.

With reference to the first or the second possible implementation manner of the third aspect, in a third possible implementation manner of the third aspect, the quantized-value generation module is specifically configured to:

quantize the transmission delay by using the first quantization precision MTs, to obtain a quantized value and a remainder of the transmission delay, where the quantized value of the transmission delay is the base value; and quantize the remainder by using the second quantization precision NTs, to obtain a quantized value of the remainder, where the quantized value of the remainder is the offset value.

With reference to the first or the second possible implementation manner of the third aspect, in a fourth possible implementation manner of the third aspect, when N is 1, the quantized-value generation module is specifically configured to:

quantize the transmission delay by using the second quantization precision NTs, to obtain an intermediate quantized value; and perform a modulo-16 operation on the intermediate quantized value, and perform rounding to obtain the base value, where a remainder is used as the offset value.

With reference to any one of the first to the fourth possible implementation manners of the third aspect, in a fifth possible implementation manner of the third aspect, during random access, the base value occupies 11 bits, and the offset value occupies 4 bits; or during non-random access, the base value occupies 6 bits, and the offset value occupies 4 bits.

With reference to the third aspect, in a sixth possible implementation manner of the third aspect, M is less than 16, N is 0, and the quantized-value generation module is specifically configured to:

quantize the transmission delay by using the first quantization precision MTs, to obtain the quantized value of the transmission delay, where the quantized value of the transmission delay is the TA quantized value.

With reference to the sixth possible implementation manner of the third aspect, in a seventh possible implementation manner of the third aspect, M is 1, 2, 4, or 8.

With reference to any one of the third aspect or the first to the seventh possible implementation manners of the third aspect, in an eighth possible implementation manner of the third aspect, the transmission delay is a timing advance $T_{ADV}$, where during random access, $T_{ADV}$=(eNB Rx-Tx time difference); or during non-random access, $T_{ADV}$=(eNB Rx-Tx time difference)+(UE Rx-Tx time difference), where the "eNB Rx-Tx time difference" represents a difference between a receiving time and a transmitting time of the base station, and the "UE Rx-Tx time difference" represents a difference between a receiving time and a transmitting time of the UE.

With reference to any one of the third aspect or the first to the eighth possible implementation manners of the third aspect, in a ninth possible implementation manner of the third aspect, the base station sends the TA quantized value by using a TA command.

With reference to any one of the third aspect or the first to the ninth possible implementation manners of the third aspect, in a tenth possible implementation manner of the third aspect, the base station further includes:

a receiving module, configured to receive a measurement report and call information that are sent by the UE; and an optimization module, configured to: determine network coverage information and traffic information according to the TA quantized value, the measurement report, and the call information, and perform network planning or optimization according to the network coverage information and the traffic information.

According to a fourth aspect, an embodiment of the present invention provides user equipment, including:

a receiving module, configured to receive a timing advance TA quantized value sent by a base station, where the TA quantized value includes a base value and an offset value, quantization precision of the base value is first quantization precision MTs, quantization precision of the offset value is second quantization precision NTs, M is a positive integer less than or equal to 16, N is a nonnegative integer less than M, and Ts is a minimum time unit in a Long Term Evolution (LTE) system and has a value of 1/30.72 μs;

a transmission timing determining module, configured to determine a transmission timing adjustment amount according to the TA quantized value; and an adjustment module, configured to perform uplink transmission timing adjustment according to the transmission timing adjustment amount.

With reference to the fourth aspect, in a first possible implementation manner of the fourth aspect, M is equal to 16, and N is less than 16.

With reference to the first possible implementation manner of the fourth aspect, in a second possible implementation manner of the fourth aspect, N is 1, 2, 4, or 8.

With reference to the first or the second possible implementation manner of the fourth aspect, in a third possible implementation manner of the fourth aspect, during random access, the base value occupies 11 bits, and the offset value occupies 4 bits; or during non-random access, the base value occupies 6 bits, and the offset value occupies 4 bits.

With reference to any one of the first to the third possible implementation manners of the fourth aspect, in a fourth possible implementation manner of the fourth aspect, during random access, the transmission timing adjustment amount is $N_{TA}$, $N_{TA}=T_{A\_BASE}*M+T_{A\_OFFSET}*N$, a unit of $N_{TA}$ is Ts, $T_{A\_BASE}$ is the base value, and $T_{A\_OFFSET}$ is the offset value; or during non-random access, the transmission timing adjustment amount is $N_{TA,new}$, $N_{TA,new}=N_{TA,old}+(T_{A\_BASE}-m)*M+T_{A\_OFFSET}*N$, a unit of $N_{TA,new}$ is Ts, $N_{TA,old}$ is a previous transmission timing adjustment amount, $T_{A\_BASE}$ is the base value, $T_{A\_OFFSET}$ is the offset value, m is [a maximum value of $T_{A\_BASE}/2$], and [ ] represents rounding up or rounding down.

With reference to the fourth aspect, in a fifth possible implementation manner of the fourth aspect, M is less than 16, N is 0, and the TA quantized value is the base value.

With reference to the fifth possible implementation manner of the fourth aspect, in a sixth possible implementation manner of the fourth aspect, M is 1, 2, 4, or 8.

With reference to any one of the fourth aspect or the first to the sixth possible implementation manners of the fourth aspect, in a seventh possible implementation manner of the fourth aspect, the UE receives the TA quantized value by using a TA command.

With reference to any one of the fourth aspect or the first to the seventh possible implementation manners of the fourth aspect, in an eighth possible implementation manner of the fourth aspect, the user equipment further includes:

a sending module, configured to send a measurement report and call information to the base station, so that the base station determines network coverage information and traffic information according to the TA quantized value, the measurement report, and the call information.

According to the transmission timing adjustment method and device provided in the embodiments of the present invention, in the method, a transmission delay between UE and a base station is determined, and a TA quantized value is generated according to the transmission delay. In the embodiments, the TA quantized value is improved. The TA quantized value includes a base value and an offset value, and quantization precision is designed. Quantization precision of the base value is first quantization precision MTs, quantization precision of the offset value is second quantization precision NTs, M is a positive integer less than or equal to 16, N is a nonnegative integer less than M, and Ts is a minimum time unit in a Long Term Evolution (LTE) system and has a value of 1/30.72 μs. The quantization precision is designed, so that a step of a transmission timing adjustment amount is finer, and therefore, a distance corresponding to a minimum step is also finer and is more practical for an actual network application. The embodiments of the present invention have a significant advantage in network planning and optimization.

BRIEF DESCRIPTION OF DRAWINGS

To describe the technical solutions in the embodiments of the present invention more clearly, the following briefly introduces the accompanying drawings required for describing the embodiments or the prior art. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

Figure 1:
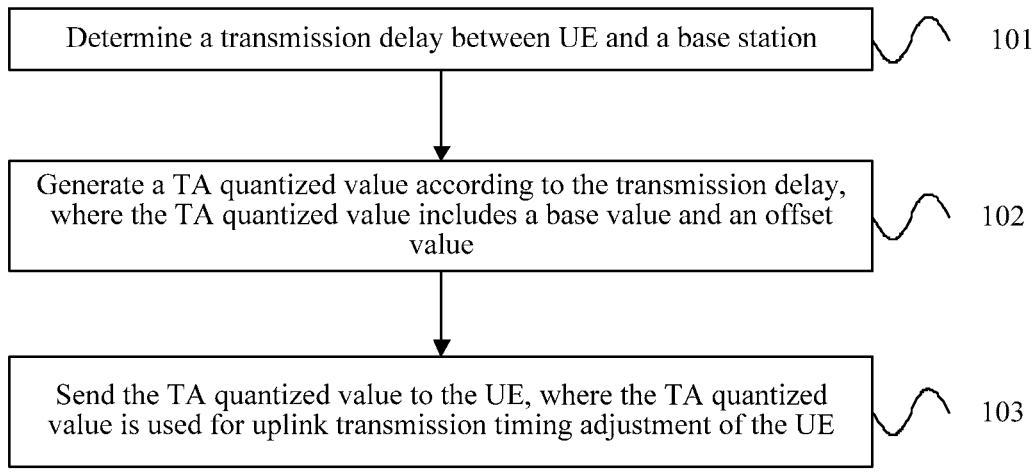
FIG. 1 is a schematic flowchart of Embodiment 1 of a transmission timing adjustment method according to the present invention.

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

In a current transmission timing adjustment mechanism, transmission timing adjustment changes by an integer multiple of 16 Ts, where Ts is a minimum time unit in an LTE system and has a value of 1/30.72 μs. A transmission timing adjustment amount is an integer multiple of 16 Ts. The integer is determined and sent to UE by a base station, and specifically, is sent to the UE by using a timing advance (TA) command $T_A$.

In a random access process of the UE, the base station determines a transmission delay between the base station and the UE by detecting a random access preamble, so as to determine a value of the TA command $T_A$ according to the transmission delay, and send the value to the UE by using a random access response, so that the UE performs transmission timing adjustment according to the TA command $T_A$, where the TA command $T_A$ occupies 11 bits and has a value range of 0, 1, 2, ..., and 1282. In this case, the transmission timing adjustment amount is $N_{TA}$ and has a unit of Ts, and $N_{TA}=T_A \times 16$. In another case, for example, after random access of the UE succeeds, the base station may re-determine the value of the TA command $T_A$, and the value is a relative value. The UE may determine a current transmission timing adjustment amount according to the value and a previous transmission timing adjustment amount. In this case, the TA command $T_A$ occupies 6 bits and has a value range of 0, 1, 2, ..., and 63, the transmission timing adjustment amount is $N_{TA,new}$ and has a unit of Ts, and $N_{TA,new}=N_{TA,old}+(T_A-31)\times 16$. The previous transmission timing adjustment amount $N_{TA,old}$ may be a transmission timing adjustment amount initially determined during random access, or may be a transmission timing adjustment amount determined in another non-random access process.

As may be seen, an existing transmission timing adjustment step is 16 Ts, and a distance that is between the UE and the base station and that corresponds to the step is 1/30.72× 16×speed of light/2=78 m. Therefore, for UE within a range of 78 m away from the base station and for UE within a range of 156 m away from the base station, TA commands $T_A$ are the same, and transmission timing adjustment amounts are also the same.

However, in an actual network layout, a hotspot urban area, an outer suburb, and a micro cell have completely different coverage. Stations covering an urban area are dense. Most (more than 90% according to analysis of actual data) UEs in a cell are distributed within a range of 2 km. Therefore, a coverage map made according to an existing transmission timing adjustment mechanism has low identifiability, and is not sufficiently applicable to an area of hotspot coverage. In addition, a cell radius of a micro cell is set far less than that of a macro cell. Most UEs are distributed within a range of 1 km. Similarly, a coverage map made according to the existing transmission timing adjustment mechanism has excessively low precision and has extremely low differentiability. Therefore, use of network optimization is limited.

Based on the foregoing consideration, in embodiments of the present invention, quantization precision of TA is designed, so that a transmission timing adjustment step is finer, and therefore, a distance corresponding to a minimum step is also finer and is more practical for an actual network application. The embodiments of the present invention have a significant advantage particularly in network planning and optimization. A detailed description is given below with reference to the embodiments.

FIG. 1 is a schematic flowchart of Embodiment 1 of a transmission timing adjustment method according to the present invention. This embodiment is executed by a base station, and the base station may be implemented by using software and/or hardware. As shown in FIG. 1, the method in this embodiment may include:

Step 101: Determine a transmission delay between UE and the base station.

Step 102: Generate a TA quantized value according to the transmission delay, where the TA quantized value includes a base value and an offset value.

Quantization precision of the base value is first quantization precision MTs, quantization precision of the offset value is second quantization precision NTs, M is a positive integer less than or equal to 16, N is a nonnegative integer less than M, and Ts is a minimum time unit in an LTE system and has a value of 1/30.72 μs.

Step 103: Send the TA quantized value to the UE, where the TA quantized value is used for uplink transmission timing adjustment of the UE.

In a specific application scenario, an important feature of uplink transmission is that different UEs perform orthogonal multiple access on time-frequency, so that uplink transmission of the different UEs from a same cell does not interfere with each other. To ensure orthogonality of the uplink transmission and avoid intra-cell interference, the base station requires that signals of different UEs from a same subframe but different frequency domain resources arrive at the base station at basically aligned time. As long as the base station receives, within a cyclic prefix range, uplink data sent by the UEs, the base station can correctly decode the uplink data. Therefore, uplink synchronization requires that the signals of the different UEs from the same subframe arrive at the base station at a time that falls within the cyclic prefix. To ensure time synchronization on a base station side, LTE proposes an uplink TA mechanism. The base station sends the TA quantized value by using a TA command $T_A$, so that the UEs determine a transmission timing adjustment amount according to the TA quantized value, and adjust an uplink transmitting time according to the transmission timing adjustment amount.

The transmission delay in step 101 may be a bidirectional transmission delay, or may be a unidirectional transmission delay. Currently, a value of the TA command $T_A$ is determined by using the bidirectional transmission delay. Therefore, in this embodiment, the bidirectional transmission delay is also used as an example for a detailed description. Moreover, the bidirectional transmission delay may be used as a timing advance amount (timing advance) $T_{ADV}$. Persons skilled in the art may understand that the timing advance amount can be also termed timing advance which is the same as a full name of TA, and to distinguish between the timing advance amount and the TA, $T_{ADV}$ is used to identify the timing advance amount. There are two cases for $T_{ADV}$: First, $T_{ADV}$=(eNB Rx–Tx time difference)+(UE Rx–Tx time difference); and second, $T_{ADV}$=(eNB Rx–Tx time difference), where the "eNB Rx–Tx time difference" represents a difference between a receiving time and a transmitting time of the base station, and the "UE Rx–Tx time difference" represents a difference between a receiving time and a transmitting time of the UE. Moreover, the first case is applicable to a non-random access scenario, and the second case is applicable to a random access scenario.

Therefore, in step 101, a scenario for determining the transmission delay may include two cases. In one case, during initial synchronization, in a random access process of the UE, the base station determines the transmission delay between the UE and the base station, that is, the timing advance $T_{ADV}$ of the UE. In the other case, during updating synchronization, that is, after the UE completes the random access process, when the UE establishes a radio resource control (RRC) connection or when the UE is in an RRC connected state, the base station acquires the transmission delay between the UE and the base station, that is, the timing advance $T_{ADV}$ of the UE. A specific process is described in detail in the following embodiments, and details are no longer described herein.

In step 102, after determining the timing advance $T_{ADV}$, the base station converts the timing advance $T_{ADV}$ into the TA command $T_A$ delivered to the UE. The TA command $T_A$ is the foregoing TA quantized value. Different from an existing TA command $T_A$, the TA command $T_A$ includes the base value and the offset value. The base value is set to $T_{A\_BASE}$, and the offset value is set to $T_{A\_OFFSET}$.

In this embodiment, the quantization precision of the base value is the first quantization precision MTs, and the quantization precision of the offset value is the second quantization precision NTs. When the first quantization precision is equal to 16 Ts and the second quantization precision is less than 16 Ts, quantization precision may be improved by using an offset value whose quantization precision is less than 16 Ts, so as to further decrease a transmission timing adjustment step. In addition, when the first quantization precision is less than 16 Ts, the second quantization precision may be finer, or the second quantization precision may not be used, so as to improve the quantization precision and decrease the transmission timing adjustment step. Therefore, compared with the prior art, the transmission timing adjustment step in this embodiment is finer, so that a distance corresponding to a minimum step is also finer and is more practical for an actual network application. This embodiment of the present invention has a significant advantage particularly in network planning and optimization. Moreover, this change does not affect an application of the foregoing transmission timing adjustment, and the transmission timing adjustment is more accurate.

Therefore, during the initial synchronization, the transmission timing adjustment amount is $N_{TA}=M*T_{A\_BASE}+N*T_{A\_OFFSET}$, where a unit of $N_{TA}$ is Ts. During the updating synchronization, the transmission timing adjustment amount is $N_{TA,new}=N_{TA,old}+(T_{A\_BASE}-m)*M+T_{A\_OFFSET}*N$, where a unit of $N_{TA,new}$ is Ts, M is a value of the first quantization precision, N is a value of the second quantization precision, $N_{TA,old}$ is a previous transmission timing adjustment amount, m is [a maximum value of $T_{A\_BASE}/2$], and [ ] represents rounding up or rounding down. As may be seen, in this case, the quantization precision may reach NTs, thereby improving application value of network planning and optimization.

Implementation forms of the quantization precision and the TA quantized value are described in detail below.

When the first quantization precision is 16 Ts, the base value $T_{A\_BASE}$ is the same as the existing TA command $T_A$. During the initial synchronization, the base value $T_{A\_BASE}$ occupies 11 bits and has a value range of 0, 1, 2, . . . , and 1282. During the updating synchronization, the base value $T_{A\_BASE}$ occupies 6 bits and has a value range of 0, 1, 2, . . . , and 63. In this case, the second quantization precision is less than 16 Ts, and may be, for example, 1 Ts, 2 Ts, 4 Ts, or 8 Ts. The offset value $T_{A\_OFFSET}$ may occupy 4 bits, has a value range of all or some of values from 0 to 15, and specifically varies depending on a value of N. 1 Ts is used as an example, and the value range is all values from 0 to 15. Then, during the initial synchronization, the transmission timing adjustment amount is $N_{TA}=16*T_{A\_BASE}+T_{A\_OFFSET}$, and has a unit of Ts. During the updating synchronization, the transmission timing adjustment amount is $N_{TA,new}=N_{TA,old}+(T_{A\_BASE}-31)*16+T_{A\_OFFSET}$. As may be seen, in this case, the quantization precision may reach 1 Ts, thereby greatly improving differentiability, and improving application value of network planning and optimization.

When the first quantization precision is less than 16 Ts, for example, 1 Ts, 2 Ts, 4 Ts, or 8 Ts, the second quantization precision is finer than the first quantization precision, that is, N is less than M. In this case, bits occupied by the base value $T_{A\_BASE}$ increase as compared with the prior art. Bits occupied by the offset value $T_{A\_OFFSET}$ are set according to the quantization precision of the offset value and the quantization precision of the base value. To reduce complexity of adjusting both the first quantization precision and the second quantization precision as compared with the prior art, preferably, N may be 0, that is, finer quantization precision is directly selected to implement quantization. As compared with the foregoing manner, in implementation of this manner, the second quantization precision does not exist, and the offset value $T_{A\_OFFSET}$ is 0, that is, the offset value does not have an actual meaning. Therefore, the offset value $T_{A\_OFFSET}$ no longer occupies any bit, and the implementation is simple.

As may be seen, when the first quantization precision is 16 Ts, an existing protocol may be kept unchanged, as long as a field reflecting the offset value is added to an original protocol. Compatibility of this manner is relatively desirable. When the first quantization precision is less than 16 Ts, the implementation is simple, but a quantity of bits occupied by the TA command $T_A$ needs to be increased, and higher quantization precision indicates more occupied bits.

In the foregoing embodiment, when N is 0, in a generation manner of the TA quantized value, the foregoing transmission delay may be quantized by using the first quantization precision MTs, and an obtained quantized value of the transmission delay is the TA quantized value.

For example, when the first quantization precision MTs is 4 Ts, after acquiring the transmission delay 89 Ts, the base station divides the transmission delay 89 Ts by 4 Ts, and performs rounding down, to obtain the quantized value 22 of the transmission delay. The quantized value 22 of the transmission delay is the TA quantized value.

Figure 2:
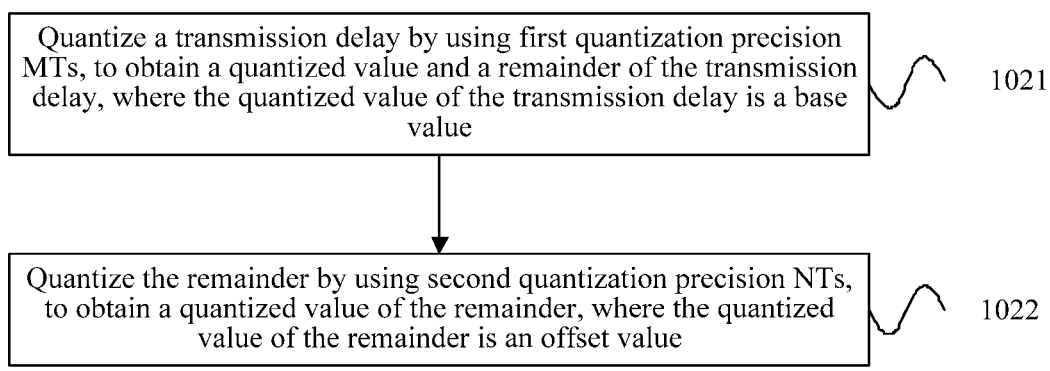
FIG. 2 is a schematic flowchart of Embodiment 1 of a quantization process according to an embodiment of the present invention.

When N is not 0, in a generation manner of the TA quantized value, the foregoing transmission delay may be quantized by using the first quantization precision MTs, where the quantized value of the transmission delay is the base value; and then a remainder generated in the foregoing quantization process is quantized by using the second quantization precision NTs, to obtain a quantized value of the remainder, where the quantized value of the remainder is the offset value. In this case, referring to FIG. 2, FIG. 2 is a schematic flowchart of Embodiment 1 of a quantization process according to an embodiment of the present invention. As shown in FIG. 2, step 102 includes:

Step 1021: Quantize the transmission delay by using first quantization precision MTs, to obtain a quantized value and a remainder of the transmission delay, where the quantized value of the transmission delay is the base value.

Step 1022: Quantize the remainder by using second quantization precision NTs, to obtain a quantized value of the remainder, where the quantized value of the remainder is the offset value.

For example, when the first quantization precision MTs is 16 Ts and the second quantization precision NTs is 1 Ts, after the base station acquires the transmission delay 89 Ts, the base station divides 89 Ts by the first quantization precision 16 Ts, to obtain the quantized value 5 of the transmission delay and the remainder 9 Ts, and divides the remainder 9 Ts by 1 Ts, to obtain the quantized value 9 of the remainder. The quantized value 5 of the transmission delay is the base value, and the quantized value 9 of the remainder is the offset value.

When the first quantization precision MTs is 16 Ts and the second quantization precision NTs is 2 Ts, after the base station acquires the transmission delay 89 Ts, the base station divides 89 Ts by the first quantization precision 16 Ts, to obtain the quantized value 5 of the transmission delay and the remainder 9 Ts, divides the remainder 9 Ts by 2 Ts, to obtain 4.5, and then performs rounding down, to obtain the quantized value 4 of the remainder. The quantized value 5 of the transmission delay is the base value, and the quantized value 4 of the remainder is the offset value.

Figure 3:
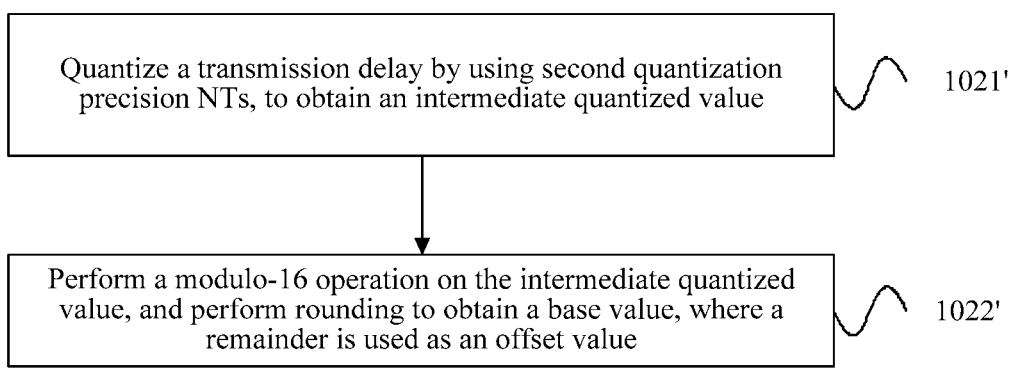
FIG. 3 is a schematic flowchart of Embodiment 2 of a quantization process according to an embodiment of the present invention.

Further, when the second quantization precision is 1 Ts, the method shown in FIG. 2 may be replaced with the following method. Referring to FIG. 3, FIG. 3 is a schematic flowchart of Embodiment 2 of a quantization process according to an embodiment of the present invention. As shown in FIG. 3, the foregoing step 102 includes:

Step 1021': Quantize the transmission delay by using second quantization precision NTs, to obtain an intermediate quantized value.

Step 1022': Perform a modulo-16 operation on the intermediate quantized value, and perform rounding to obtain the base value, where a remainder is used as an offset value.

For example, when the first quantization precision MTs is 16 Ts and the second quantization precision NTs is 1 Ts, after acquiring the transmission delay 89 Ts, the base station divides 89 Ts by the second quantization precision 1 Ts, to obtain the intermediate quantized value 89, then performs a modulo-16 operation on the intermediate quantized value 89, and performs rounding to obtain 5, that is, the base value, and the remainder 9 is the offset value.

In this embodiment, when the base station performs specific network planning or optimization, the base station further receives a measurement report and call information that are sent by the UE. The measurement report may include a transmit power, a signal to interference plus noise ratio (SINR), a reference signal received power (RSRP), a reference signal received quality (RSRQ), and the like of the user equipment. The call information includes a quantity of times of establishing an RRC connection by the user equipment, a quantity of times of establishing a radio access bearer (RAB) by the user equipment, and the like.

The base station determines network coverage information according to the TA quantized value, the measurement report, and the call information. Specifically, the base station may determine a distance between the base station and the user equipment according to the TA quantized value, and draw a coverage map of the user equipment. The base station may further learn wireless coverage information of a cell according to the measurement report. In addition, the base station may further determine traffic information of a network being busy or idle within a preset geographical location range according to the call information and the TA quantized value. Further, the base station may also collect, by comprehensively considering the TA quantized value, the measurement report, and the call information, statistics on distribution of signal quality of user equipments that correspond to different TA quantized values, and analyze coverage of the network and traffic information of the network being busy or idle.

Further, the base station may optimize or plan a wireless network according to the network coverage information and the traffic information. For example, when the user equipments are relatively sparsely distributed, and the network is relatively idle, the base station may divide served cells again, to ensure that the UEs are properly distributed. When the UEs in the cells served by the base station are relatively densely distributed, the network is relatively busy, and network coverage is relatively poor, a macro cell or a micro cell may be added, to form macro-micro coordination networking.

In conclusion, according to the transmission timing adjustment method provided in this embodiment, a base station determines a transmission delay between UE and the base station, and generates a TA quantized value according to the transmission delay. In this embodiment, the TA quantized value is improved. The TA quantized value includes a base value and an offset value, and quantization precision is designed. Quantization precision of the base value is first quantization precision MTs, quantization precision of the offset value is second quantization precision NTs, M is a positive integer less than or equal to 16, N is a nonnegative integer less than M, and Ts is a minimum time unit in a Long Term Evolution (LTE) system and has a value of 1/30.72 μs. The quantization precision is designed, so that a step of a transmission timing adjustment amount is finer, and therefore, a distance corresponding to a minimum step is also finer and is more practical for an actual network application. This embodiment of the present invention has a significant advantage in network planning and optimization.

Figure 4:
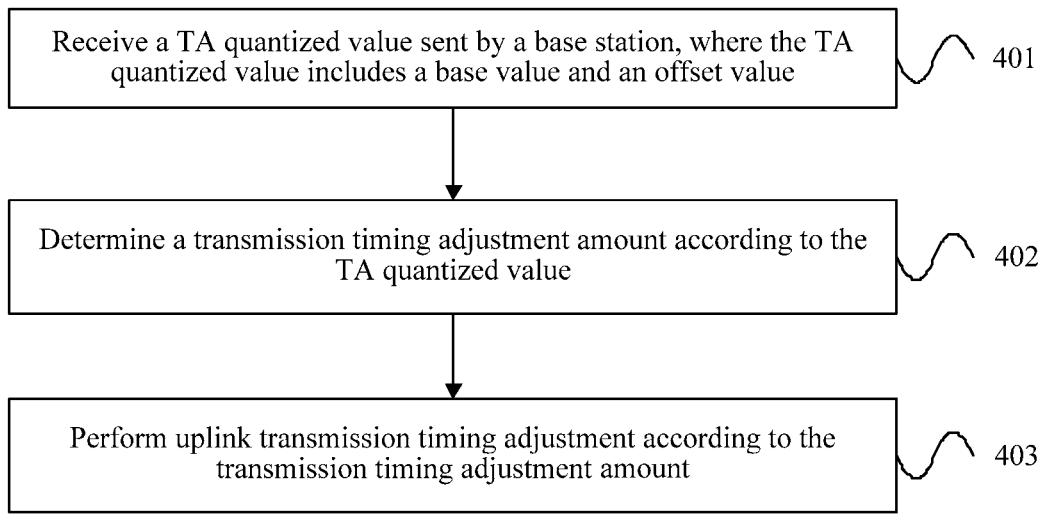
FIG. 4 is a schematic flowchart of Embodiment 2 of a transmission timing adjustment method according to the present invention.

FIG. 4 is a schematic flowchart of Embodiment 2 of a transmission timing adjustment method according to the present invention. This embodiment is executed by user equipment. The user equipment may be implemented by using software and/or hardware. In the transmission timing adjustment method in this embodiment, a transmission timing adjustment method on a user equipment side is described in detail based on Embodiment 1 of the transmission timing adjustment method. As shown in FIG. 4, the method in this embodiment may include:

Step 401: Receive a TA quantized value sent by a base station, where the TA quantized value includes a base value and an offset value.

Quantization precision of the base value is first quantization precision MTs, quantization precision of the offset value is second quantization precision NTs, M is a positive integer less than or equal to 16, N is a nonnegative integer less than M, and Ts is a minimum time unit in a Long Term Evolution (LTE) system and has a value of 1/30.72 μs.

Step 402: Determine a transmission timing adjustment amount according to the TA quantized value.

Step 403: Perform uplink transmission timing adjustment according to the transmission timing adjustment amount.

An application scenario of this embodiment is similar to Embodiment 1 of the transmission timing adjustment method. Details are no longer described herein in this embodiment.

In step 401, a scenario in which the UE receives the TA quantized value sent by the base station may include two cases. In one case, in a random access process of the UE, after the UE sends a random access preamble to the base station, the UE receives a TA quantized value that is used for initial synchronization and that is sent by the base station. In the other case, after the UE completes the random access process, when the UE establishes an RRC connection or when the UE is in an RRC connected state, the UE receives a TA quantized value that is used for updating synchronization and that is sent by the base station.

In this embodiment, the UE may receive the TA quantized value by using a TA command $T_A$, that is, the TA quantized value is implemented in a manner of the TA command $T_A$. The TA quantized value includes the base value and the offset value. The base value is set to $T_{A\_BASE}$, and the offset value is set to $T_{A\_OFFSET}$. The quantization precision of the base value is the first quantization precision MTs, and the quantization precision of the offset value is the second quantization precision NTs.

M is the positive integer less than or equal to 16, N is the nonnegative integer less than M, and Ts is the minimum time unit in the Long Term Evolution (LTE) system and has the value of 1/30.72 μs.

When the first quantization precision is equal to 16 Ts and the second quantization precision is less than 16 Ts, quantization precision may be improved by using an offset value whose quantization precision is less than 16 Ts, so as to further decrease a transmission timing adjustment step. In addition, when the first quantization precision is less than 16 Ts, the second quantization precision may be finer, or the second quantization precision may not be used, so as to improve the quantization precision and decrease the transmission timing adjustment step.

Further, when the first quantization precision is 16 Ts, the base value $T_{A\_BASE}$ is the same as the existing TA command $T_A$. During the initial synchronization (random access), the base value $T_{A\_BASE}$ occupies 11 bits and has a value range of 0, 1, 2, . . . , and 1282. During the updating synchronization (non-random access), the base value $T_{A\_BASE}$ occupies 6 bits and has a value range of 0, 1, 2, . . . , and 63. In this case, the second quantization precision is less than 16 Ts, and may be, for example, 1 Ts, 2 Ts, 4 Ts, or 8 Ts. The offset value $T_{A\_OFFSET}$ may occupy 4 bits, has a value range of all or some of values from 0 to 15, and specifically varies depending on a value of N. For example, when the second quantization precision is 1 Ts, the value range of the offset value $T_{A\_OFFSET}$ is 0, 1, 2, 3, . . . , and 15. When the second quantization precision is 2 Ts, the value range of the offset value $T_{A\_OFFSET}$ is 0, 1, 2, 3, . . . , and 7. When the second quantization precision is 4 Ts, the value range of the offset value $T_{A\_OFFSET}$ is 0, 1, 2, and 3.

When the first quantization precision is less than 16 Ts, for example, 1 Ts, 2 Ts, 4 Ts, or 8 Ts, the second quantization precision is finer than the first quantization precision, that is, N is less than M. In this case, bits occupied by the base value $T_{A\_BASE}$ increase as compared with the prior art. For example, when the first quantization precision is 8 Ts, a value range of $T_{A\_BASE}$ is 0, 1, 2, . . . , and 2564, and the occupied bits obviously increase. Bits occupied by the offset value $T_{A\_OFFSET}$ are set according to the quantization precision of the offset value and the quantization precision of the base value. To reduce complexity of adjusting both the first quantization precision and the second quantization precision as compared with the prior art, preferably, N may be 0, that is, finer quantization precision is directly selected to implement quantization. As compared with the foregoing manner, in implementation of this manner, the second quantization precision does not exist, and the offset value $T_{A\_OFFSET}$ is 0, that is, the offset value does not have an actual meaning. Therefore, the offset value $T_{A\_OFFSET}$ no longer occupies any bit, and the implementation is simple.

As may be seen, when the first quantization precision is 16 Ts, an existing protocol may be kept unchanged, as long as a field reflecting the offset value is added to an original protocol. Compatibility of this manner is relatively desirable. When the first quantization precision is less than 16 Ts, the implementation is simple, but a quantity of bits occupied by the TA command $T_A$ needs to be increased, and higher quantization precision indicates more occupied bits.

In step 402, the UE determines the transmission timing adjustment amount according to the TA quantized value.

When M is equal to 16 and N is less than 16, during random access, the transmission timing adjustment amount is $N_{TA}=M*T_{A\_BASE}+N*T_{A\_OFFSET}$, where a unit of $N_{TA}$ is Ts; and during non-random access, the transmission timing adjustment amount is $N_{TA,new}=N_{TA,old}+(T_{A\_BASE}-m)*M+T_{A\_OFFSET}*N$, where a unit of $N_{TA,new}$ is Ts, $N_{TA,old}$ is a previous transmission timing adjustment amount, m is [a maximum value of $T_{A\_BASE}/2$], and [ ] represents rounding up or rounding down.

For example, when M=16 and N=1, during random access, $N_{TA}=16*T_{A\_BASE}+T_{A\_OFFSET}$; and during non-random access, $N_{TA,new}=N_{TA,old}+(T_{A\_BASE}-31)*16+T_{A\_OFFSET}$. When M=16 and N=2, during random access, $N_{TA}=16*T_{A\_BASE}+2*T_{A\_OFFSET}$; and during non-random access, $N_{TA,new}=N_{TA,old}+(T_{A\_BASE}-31)*16+2*T_{A\_OFFSET}$.

When M is less than 16, N is 0, and the TA quantized value is the base value, during random access, the transmission timing adjustment amount is $N_{TA}=M*T_{A\_BASE}$, where a unit of $N_{TA}$ is Ts; and during non-random access, the transmission timing adjustment amount is $N_{TA,new}=N_{TA,old}+(T_{A\_BASE}-m)*M$, where a unit of $N_{TA,new}$ is Ts, $N_{TA,old}$ is a previous transmission timing adjustment amount, m is [a maximum value of $T_{A\_BASE}/2$], and [ ] represents rounding up or rounding down.

For example, when M=8 and N is 0, during random access, the transmission timing adjustment amount is $N_{TA}=8*T_{A\_BASE}$; and during non-random access, the transmission timing adjustment amount is $N_{TA,new}=N_{TA,old}+8*(T_{A\_BASE}-63)$.

In step 403, the UE performs uplink transmission timing adjustment on a physical uplink control channel (PUCCH), a physical uplink shared channel (PUSCH), and a sounding reference signal (SRS) according to the transmission timing adjustment amount.

Further, on the basis of the foregoing embodiment, the UE further sends a measurement report and call information to the base station. In a specific implementation process, after measuring a wireless network and obtaining the measurement report, the UE sends the measurement report to the base station. The measurement report may include a transmit power, an SINR, an RSRP, and an RSRQ that are of the UE. The call information includes a quantity of times of establishing an RRC connection by the user equipment, a quantity of times of establishing an RAB by the user equipment, and the like, so that the base station determines network coverage information and traffic information according to the TA quantized value, the measurement report, and the call information.

In this embodiment, a TA quantized value is improved. The TA quantized value includes a base value and an offset value. Quantization precision of the base value is first quantization precision MTs, and quantization precision of the offset value is second quantization precision NTs. M is a positive integer less than or equal to 16, N is a nonnegative integer less than M, and Ts is a minimum time unit in a Long Term Evolution (LTE) system and has a value of 1/30.72 μs. Quantization precision is designed, so that a step of a transmission timing adjustment amount is finer, and therefore, a distance corresponding to a minimum step is also finer and is more practical for an actual network application. Moreover, a UE determines the transmission timing adjustment amount according to the TA quantized value; and performs uplink transmission timing adjustment according to the transmission timing adjustment amount. Therefore, the UE performs the uplink transmission timing adjustment more precisely.

The foregoing method is described in detail by separately using transmission timing adjustment that is performed during the random access process and transmission timing adjustment that is performed after random access is completed as examples.

Figure 5:
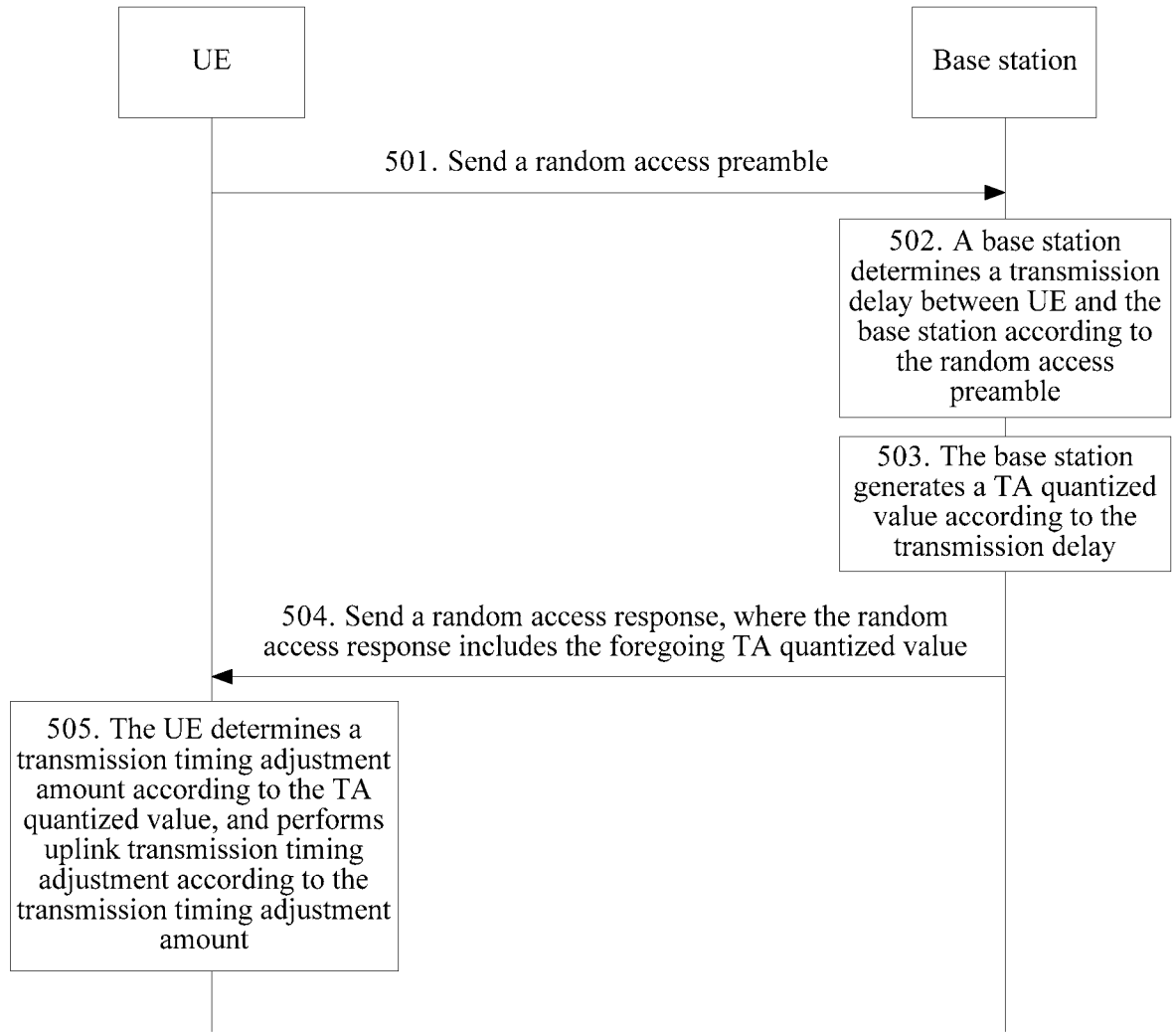
FIG. 5 is a signaling flow diagram of Embodiment 3 of a transmission timing adjustment method according to the present invention.

Referring to FIG. 5, FIG. 5 is a signaling flow diagram of Embodiment 3 of a transmission timing adjustment method according to the present invention. As shown in FIG. 5, the transmission timing adjustment method provided in this embodiment includes:

Step 501: UE sends a random access preamble to a base station.

For example, the UE sends the random access preamble to the base station on a physical random access channel (PRACH).

Step 502: The base station determines a transmission delay between the UE and the base station according to the random access preamble.

In this embodiment, the transmission delay is a timing advance $T_{ADV}$, and a method for determining the timing advance $T_{ADV}$, for example, may be: searching, by the base station by using a search window, for the random access preamble sent by the UE. Specifically, the search window keeps moving outwards until the random access preamble sent by the UE is received. The transmission delay between the UE and the base station is obtained through calculation according to a location and a size of the search window in which the random access preamble is found.

Step 503: The base station generates a TA quantized value according to the transmission delay.

The TA quantized value includes a base value and an offset value. A description about the TA quantized value is the same as that in the foregoing embodiment. Details are no longer described herein.

Step 504: The base station sends a random access response to the UE, where the random access response includes the foregoing TA quantized value.

For example, the base station sends the random access response to the UE on a physical downlink shared channel (PDSCH). Moreover, when quantization precision of the base value of the TA quantized value is 16 Ts, the base value of the TA quantized value is the same as an existing TA command $T_A$. A field reflecting an offset value is added for the offset value based on an original protocol. When the quantization precision of the base value is less than 16 Ts, a size of a field reflecting an original TA command $T_A$, that is, a quantity of bits occupied by the original TA command $T_A$, needs to be increased.

Step 505: The UE determines a transmission timing adjustment amount according to the TA quantized value, and performs uplink transmission timing adjustment according to the transmission timing adjustment amount.

In an LTE system of 3GPP, the user equipment establishes an uplink synchronization relationship with the base station by using a random access process. The random access process includes a contention-based random access process and a non-contention-based random access process. In this embodiment, the contention-based random access process is used as an example herein for description. The non-contention-based random access process is similar, and details are no longer described herein in this embodiment.

After step 505, the user equipment adjusts an uplink transmitting time of a PUCCH, an uplink transmitting time of a PUSCH, and an uplink transmitting time of an SRS according to the timing advance amount.

Persons skilled in the art may understand that after step 503, conflict detection of the base station, an RRC connection of the UE, and the like are further included. Details are no longer described herein in this embodiment.

Although the UE implements uplink synchronization with the base station in the random access process, a time at which an uplink signal arrives at the base station may change with time. For example, a transmission delay between fast-moving UE or UE in a running high-speed train and the base station keeps changing. For another example, a current transmission path disappears, and a new transmission path is switched to: Specifically, in a city with dense buildings, when UE is at a corner of a building, this case may occur. For another possible case, no special limitation is made herein in this embodiment. Therefore, the UE needs to update an uplink timing advance amount of the UE in time, so as to maintain uplink synchronization. In LTE, when the UE establishes an RRC connection or the user equipment is in an RRC state, the base station adjusts the uplink timing advance amount by using a closed-loop mechanism. For details, refer to the following embodiment.

Figure 6:
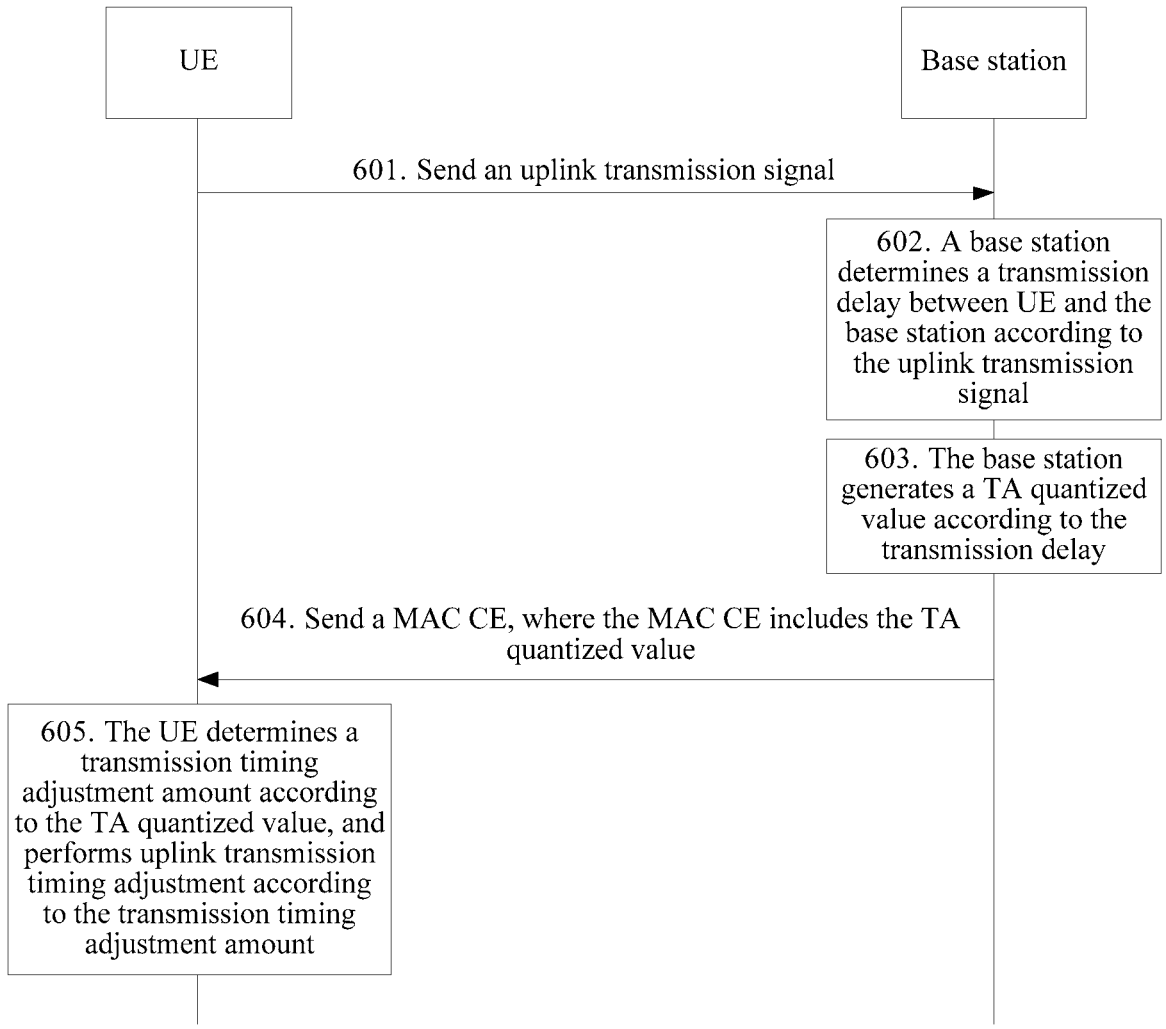
FIG. 6 is a signaling flow diagram of Embodiment 4 of a transmission timing adjustment method according to the present invention.

Referring to FIG. 6, FIG. 6 is a signaling flow diagram of Embodiment 4 of a transmission timing adjustment method according to the present invention. As shown in FIG. 6, the transmission timing adjustment method provided in this embodiment includes:

Step 601: UE sends an uplink transmission signal to a base station.

Specifically, after completing a random access process, the UE sends the uplink transmission signal to the base station.

Step 602: The base station determines a transmission delay between the UE and the base station according to the uplink transmission signal.

In this embodiment, the transmission delay is a timing advance $T_{ADV}$.

Step 603: The base station generates a TA quantized value according to the transmission delay.

Step 604: The base station sends a media access control control element (MAC CE) to the UE, where the MAC CE includes the TA quantized value.

Step 605: The UE determines a transmission timing adjustment amount according to the TA quantized value, and performs uplink transmission timing adjustment according to the transmission timing adjustment amount.

In this embodiment, the TA quantized value includes a base value and an offset value. A description about the TA quantized value is the same as that in the foregoing embodiment. Details are no longer described herein. Moreover, when quantization precision of the base value of the TA quantized value is 16 Ts, the base value of the TA quantized value is the same as an existing TA command $T_A$. A field reflecting the offset value is added for the offset value based on an original protocol. When the quantization precision of the base value is less than 16 Ts, a size of a field reflecting an original TA command $T_A$, that is, a quantity of bits occupied by the original TA command $T_A$, needs to be increased.

In step 601, when establishing an RRC connection or being in an RRC state, the UE sends the uplink transmission signal to the base station. In step 602, theoretically, any uplink transmission signal sent by the UE may be used to measure the timing advance $T_{ADV}$. Optionally, the base station may select a de-modulation reference signal (DMRS), a sounding reference signal (SRS), or a physical uplink control channel (PUCCH) to measure the timing advance $T_{ADV}$. In a specific implementation process, the DMRS is preferentially selected to measure the timing advance $T_{ADV}$, the SRS is less preferentially selected to measure the timing advance $T_{ADV}$, and the PUCCH is least preferentially selected to measure the timing advance $T_{ADV}$.

Figure 7:
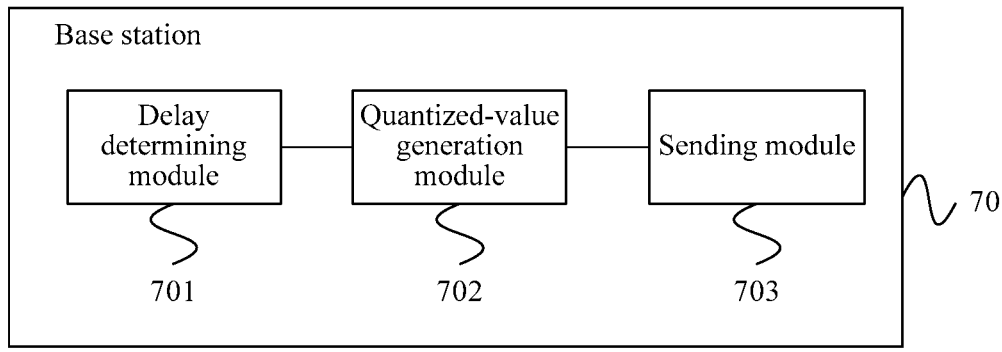
FIG. 7 is a schematic structural diagram of Embodiment 1 of a base station according to the present invention.

FIG. 7 is a schematic structural diagram of Embodiment 1 of a base station according to the present invention. As shown in FIG. 7, the base station 70 provided in this embodiment includes: a delay determining module 701, a quantized-value generation module 702, and a sending module 703.

The delay determining module 701 is configured to determine a transmission delay between UE and the base station.

The quantized-value generation module 702 is configured to generate a timing advance TA quantized value according to the transmission delay, where the TA quantized value includes a base value and an offset value, quantization precision of the base value is first quantization precision MTs, quantization precision of the offset value is second quantization precision NTs, M is a positive integer less than or equal to 16, N is a nonnegative integer less than M, and Ts is a minimum time unit in a Long Term Evolution (LTE) system and has a value of 1/30.72 μs.

The sending module 703 is configured to send the TA quantized value to the UE, where the TA quantized value is used for uplink transmission timing adjustment of the UE.

Determining of the transmission delay, determining of the TA quantized value and bits occupied by the TA quantized value in different quantization precision cases are the same as those in the foregoing embodiment. Details are no longer described herein, and merely a simple description is given as follows:

Optionally, M is equal to 16, and N is less than 16. For example, N is 1, 2, 4, or 8.

Optionally, the quantized-value generation module 702 is specifically configured to:

quantize the transmission delay by using the first quantization precision MTs, to obtain a quantized value and a remainder of the transmission delay, where the quantized value of the transmission delay is the base value; and quantize the remainder by using the second quantization precision NTs, to obtain a quantized value of the remainder, where the quantized value of the remainder is the offset value.

Optionally, when N is 1, the quantized-value generation module 702 is specifically configured to:

quantize the transmission delay by using the second quantization precision NTs, to obtain an intermediate quantized value; and perform a modulo-16 operation on the intermediate quantized value, and perform rounding to obtain the base value, where a remainder is used as the offset value.

Optionally, during random access, the base value occupies 11 bits, and the offset value occupies 4 bits; or during non-random access, the base value occupies 6 bits, and the offset value occupies 4 bits.

Optionally, M is less than 16, N is 0, and in this case, the quantized-value generation module is specifically configured to:

quantize the transmission delay by using the first quantization precision MTs, to obtain the quantized value of the transmission delay, where the quantized value of the transmission delay is the TA quantized value. For example, M may be 1, 2, 4, or 8.

Optionally, the transmission delay is a timing advance $T_{ADV}$, where during random access, $T_{ADV}$=(eNB Rx–Tx time difference); or during non-random access, $T_{ADV}$=(eNB Rx–Tx time difference)+(UE Rx–Tx time difference), where the "eNB Rx–Tx time difference" represents a difference between a receiving time and a transmitting time of the base station, and the "UE Rx-Tx time difference" represents a difference between a receiving time and a transmitting time of the UE.

Optionally, the base station sends the TA quantized value by using a TA command. Moreover, when the quantization precision of the base value of the TA quantized value is 16 Ts, the base value of the TA quantized value is the same as an existing TA command. A field reflecting an offset value is added for the offset value based on an original protocol. When the quantization precision of the base value is less than 16 Ts, a size of a field reflecting an original TA command $T_A$, that is, a quantity of bits occupied by the original TA command $T_A$, needs to be increased.

Figure 8:
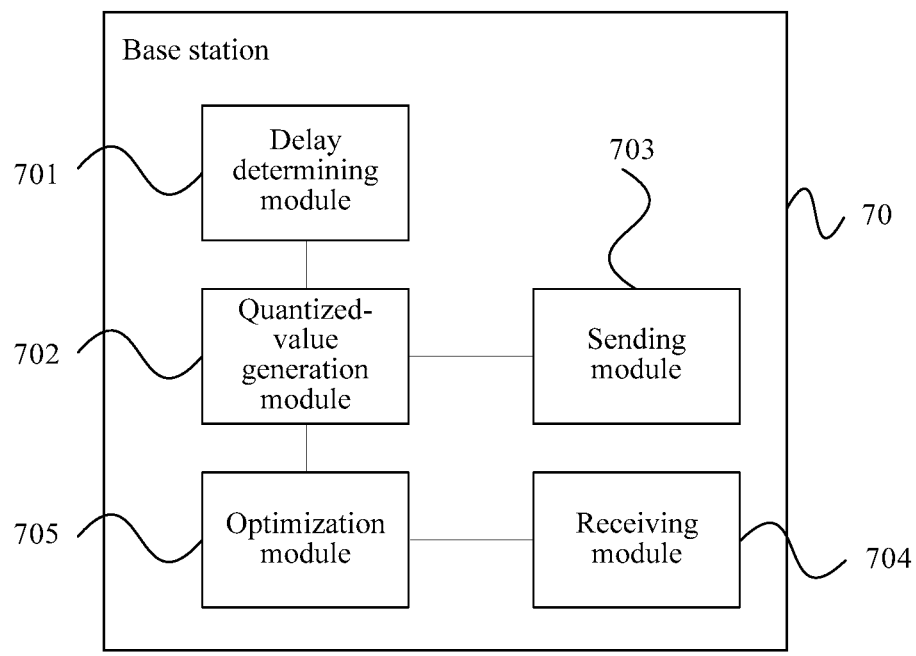
FIG. 8 is a schematic structural diagram of Embodiment 2 of a base station according to the present invention.

FIG. 8 is a schematic structural diagram of Embodiment 2 of a base station according to the present invention. As shown in FIG. 8, the base station 70 provided in this embodiment is implemented based on the embodiment in FIG. 7. In this case, the base station further includes:

a receiving module 704, configured to receive a measurement report and call information that are sent by the UE; and an optimization module 705, configured to: determine network coverage information and traffic information according to the TA quantized value, the measurement report, and the call information, and perform network planning or optimization according to the network coverage information and the traffic information.

The base station provided in this embodiment may execute the technical solutions in the foregoing method embodiments, implementation principles and technical effects thereof are similar, and details are no longer described herein in this embodiment.

It should be noted that, the receiving module 704 in this embodiment may be a receiver of the base station and the sending module 703 may be a transmitter of the base station. In addition, the receiving module 704 and the sending module 703 may be integrated to form a transceiver of the base station. The delay determining module 701 may be a separately disposed processor, or may be implemented by being integrated in a processor of the base station, and in addition, may be stored in a memory of the base station in a form of program code, and a processor of the base station invokes the program code and executes a function of the foregoing delay determining module 701. Implementation of the quantized-value generation module 702 and implementation of the optimization module 705 are the same as that of the delay determining module 701. The quantized-value generation module 702 and the optimization module 705 may be integrated with the delay determining module 701, or may be independently implemented. The processor herein may be a central processing unit (CPU) or an application-specific integrated circuit (ASIC), or may be configured into one or more integrated circuits for implementing this embodiment of the present invention.

Figure 9:
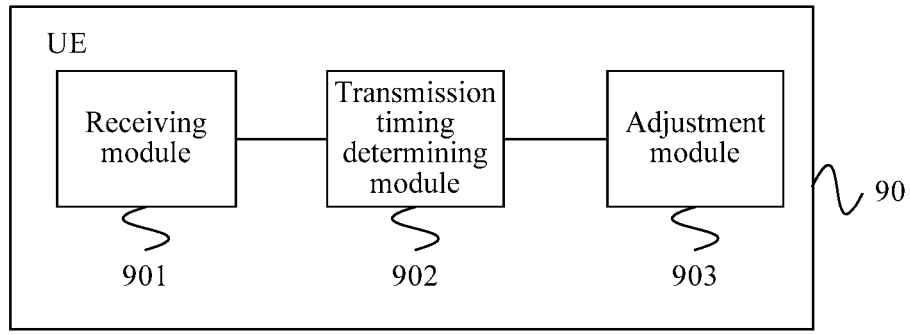
FIG. 9 is a schematic structural diagram of Embodiment 1 of user equipment according to the present invention.

FIG. 9 is a schematic structural diagram of Embodiment 1 of user equipment according to the present invention. As shown in FIG. 9, the UE 90 provided in this embodiment includes: a receiving module 901, a transmission timing determining module 902, and an adjustment module 903.

The receiving module 901 is configured to receive a timing advance TA quantized value sent by a base station, where the TA quantized value includes a base value and an offset value, quantization precision of the base value is first quantization precision MTs, quantization precision of the offset value is second quantization precision NTs, M is a positive integer less than or equal to 16, N is a nonnegative integer less than M, and Ts is a minimum time unit in a Long Term Evolution (LTE) system and has a value of 1/30.72 µs.

The transmission timing determining module 902 is configured to determine a transmission timing adjustment amount according to the TA quantized value.

The adjustment module 903 is configured to perform uplink transmission timing adjustment according to the transmission timing adjustment amount.

In different quantization precision cases, determining of the TA quantized value and bits occupied by the TA quantized value are the same as those in the foregoing embodiment. Details are no longer described herein, and merely a simple description is given as follows:

Optionally, M is equal to 16, and N is less than 16. For example, N may be 1, 2, 4, or 8.

Optionally, during random access, the base value occupies 11 bits, and the offset value occupies 4 bits; or during non-random access, the base value occupies 6 bits, and the offset value occupies 4 bits.

Optionally, during random access, the transmission timing adjustment amount is $N_{TA}$, and $N_{TA}=T_{A\_BASE}*M+T_{A\_OFFSET}*N$, where a unit of $N_{TA}$ is Ts, $T_{A\_BASE}$ is the base value, and $T_{A\_OFFSET}$ is the offset value; or during non-random access, the transmission timing adjustment amount is $N_{TA,new}$, and $N_{TA,new}=N_{TA,old}+(T_{A\_BASE}-m)*M+T_{A\_OFFSET}*N$, where a unit of $N_{TA,new}$ is Ts, $N_{TA,old}$ is a previous transmission timing adjustment amount, $T_{A\_BASE}$ is the base value, $T_{A\_OFFSET}$ is the offset value, m is [a maximum value of $T_{A\_BASE}/2$], and [ ] represents rounding up or rounding down.

Optionally, M is less than 16, N is 0, and the TA quantized value is the base value. For example, M may be 1, 2, 4, or 8.

Optionally, the UE receives the TA quantized value by using a TA command.

Figure 10:
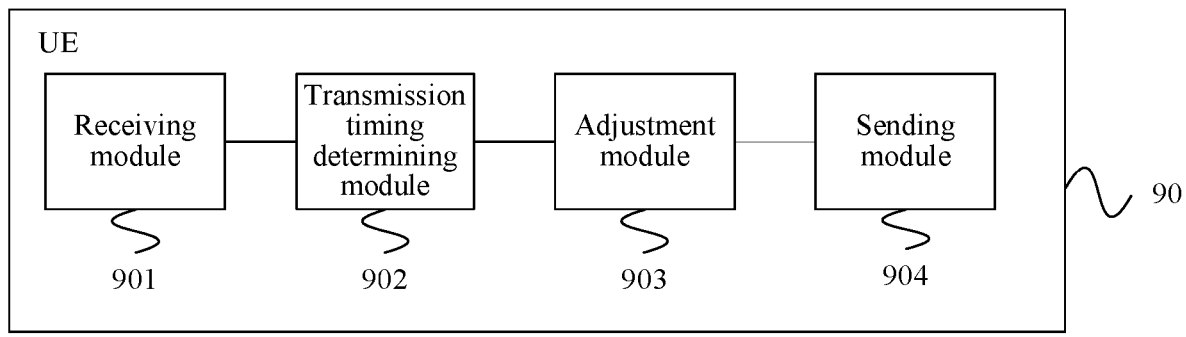
FIG. 10 is a schematic structural diagram of Embodiment 2 of user equipment according to the present invention.

FIG. 10 is a schematic structural diagram of Embodiment 2 of user equipment according to the present invention. As shown in FIG. 10, the UE 90 provided in this embodiment is implemented based on the embodiment in FIG. 9, and specifically further includes:

a sending module 904, configured to send a measurement report and call information to the base station, so that the base station determines network coverage information and traffic information according to the TA quantized value, the measurement report, and the call information.

The UE provided in this embodiment may be configured to execute the technical solutions in the foregoing method embodiments, implementation principles and technical effects thereof are similar, and details are no longer described herein in this embodiment.

It should be noted that, the receiving module 901 in this embodiment may be a receiver of the UE and the sending module 904 may be a transmitter of the UE. In addition, the receiving module 901 and the sending module 904 may be integrated to form a transceiver of the UE. The transmission timing determining module 902 may be a separately disposed processor, or may be implemented by being integrated in a processor of the UE, and in addition, may be stored in a memory of the UE in a form of program code, and a processor of the UE invokes the program code and executes a function of the foregoing transmission timing determining module 902. Implementation of the adjustment module 903 is the same as that of the transmission timing determining module 902. The adjustment module 903 may be integrated with the transmission timing determining module 902, or may be independently implemented. The processor herein may be a central processing unit (CPU) or an application-specific integrated circuit (ASIC), or may be configured into one or more integrated circuits for implementing this embodiment of the present invention.

Figure 11:
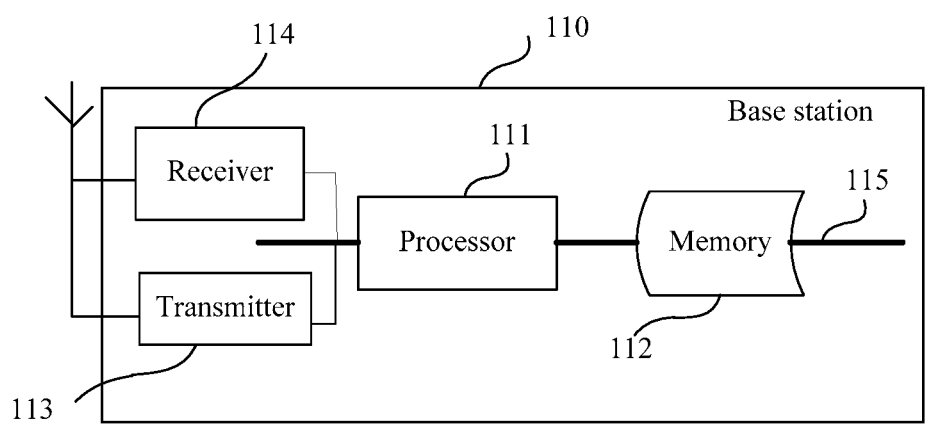
FIG. 11 is a schematic structural diagram of Embodiment 3 of a base station according to the present invention.

FIG. 11 is a schematic structural diagram of Embodiment 3 of a base station according to the present invention. As shown in FIG. 11, the base station 110 provided in this embodiment includes: a processor 111, a receiver 114, and a transmitter 113. The figure also shows a memory 112 and a bus 115. The processor 111, the receiver 114, the transmitter 113, and the memory 112 are connected to each other and accomplish communication with each other by using the bus 115.

The processor 111 is configured to:

determine a transmission delay between UE and the base station;

generate a timing advance TA quantized value according to the transmission delay, where the TA quantized value includes a base value and an offset value, quantization precision of the base value is first quantization precision MTs, quantization precision of the offset value is second quantization precision NTs, M is a positive integer less than or equal to 16, N is a nonnegative integer less than M, and Ts is a minimum time unit in a Long Term Evolution (LTE) system and has a value of 1/30.72 μs; and send the TA quantized value to the UE by using the transmitter 113, where the TA quantized value is used for uplink transmission timing adjustment of the UE.

Determining of the transmission delay, determining of the TA quantized value and bits occupied by the TA quantized value in different quantization precision cases are the same as those in the foregoing embodiment. Details are no longer described herein, and merely a simple description is given as follows:

Optionally, M is equal to 16, and N is less than 16. For example, N may be 1, 2, 4, or 8.

Optionally, the processor 111 is specifically configured to:

quantize the transmission delay by using the first quantization precision MTs, to obtain a quantized value and a remainder of the transmission delay, where the quantized value of the transmission delay is the base value; and quantize the remainder by using the second quantization precision NTs, to obtain a quantized value of the remainder, where the quantized value of the remainder is the offset value.

Optionally, when N is 1, the processor 111 is specifically configured to: quantize the transmission delay by using the second quantization precision NTs, to obtain an intermediate quantized value; and perform a modulo-16 operation on the intermediate quantized value, and perform rounding to obtain the base value, where a remainder is used as the offset value.

Optionally, during random access, the base value occupies 11 bits, and the offset value occupies 4 bits; or during non-random access, the base value occupies 6 bits, and the offset value occupies 4 bits.

Optionally, M is less than 16, N is 0, and the processor 111 is specifically configured to quantize the transmission delay by using the first quantization precision MTs, to obtain the quantized value of the transmission delay, where the quantized value of the transmission delay is the TA quantized value. For example, M may be 1, 2, 4, or 8.

Optionally, the transmission delay is a timing advance $T_{ADV}$. During random access, $T_{ADV}$=(eNB Rx−Tx time difference); or during non-random access, $T_{ADV}$=(eNB Rx−Tx time difference)+(UE Rx−Tx time difference), where the "eNB Rx−Tx time difference" represents a difference between a receiving time and a transmitting time of the base station, and the "UE Rx−Tx time difference" represents a difference between a receiving time and a transmitting time of the UE.

Optionally, the base station sends the TA quantized value by using a TA command.

Optionally, the processor 111 is further configured to: receive, by using the receiver 114, a measurement report and call information that are sent by the UE; determine network coverage information and traffic information according to the TA quantized value, the measurement report, and the call information; and perform network planning or optimization according to the network coverage information and the traffic information.

It should be noted that the processor 111 herein may be one processor, or may be a general term of multiple processing elements. For example, the processor may be a central processing unit (CPU) or may be an application-specific integrated circuit (ASIC), or may be configured into one or more integrated circuits for implementing this embodiment of the present invention, such as one or more digital signal processors (DSP) or one or more field programmable gate arrays (FPGA).

The memory 112 may be one storage apparatus, or may be a general term of multiple storage elements, and is configured to store executable program code or a parameter, data, and the like that are needed in operation of the base station. The memory 112 may include a random access memory (RAM) or may include a non-volatile memory, such as a magnetic disk memory or a flash memory.

The bus 115 may be an industry standard architecture (ISA) bus, a peripheral component interconnect (PCI) bus, an extended industry standard architecture (EISA) bus, or the like. The bus 115 may be classified into an address bus, a data bus, a control bus, and the like. For ease of representation, the bus in FIG. 11 is represented by using only one bold line, but it does not indicate that there is only one bus or only one type of bus.

The base station provided in this embodiment may be configured to execute the technical solutions in the foregoing method embodiments, implementation principles and technical effects thereof are similar, and details are no longer described herein in this embodiment.

Figure 12:
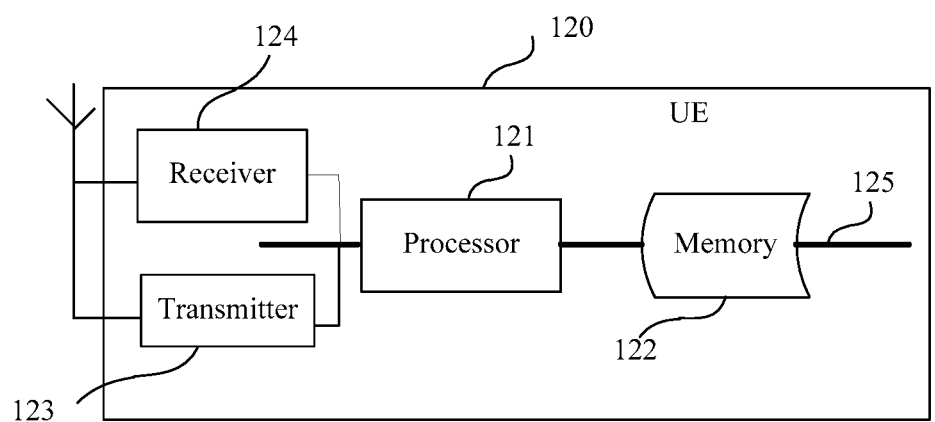
FIG. 12 is a schematic structural diagram of Embodiment 3 of user equipment according to the present invention.

FIG. 12 is a schematic structural diagram of Embodiment 3 of user equipment according to the present invention. As shown in FIG. 12, the UE 120 provided in this embodiment includes: a processor 121, a receiver 124, and a transmitter 123. The figure also shows a memory 122 and a bus 125. The processor 121, the receiver 124, the transmitter 123, and the memory 122 are connected to each other and accomplish communication with each other by using the bus 125.

The processor 121 is specifically configured to:

receive, by using the receiver 124, a timing advance TA quantized value sent by a base station, where the TA quantized value includes a base value and an offset value, quantization precision of the base value is first quantization precision MTs, quantization precision of the offset value is second quantization precision NTs, M is a positive integer less than or equal to 16, N is a nonnegative integer less than M, and Ts is a minimum time unit in a Long Term Evolution (LTE) system and has a value of 1/30.72 μs;

determine a transmission timing adjustment amount according to the TA quantized value; and perform uplink transmission timing adjustment according to the transmission timing adjustment amount.

In different quantization precision cases, determining of the TA quantized value and bits occupied by the TA quantized value are the same as those in the foregoing embodiment. Details are no longer described herein, and merely a simple description is given as follows:

Optionally, M is equal to 16, and N is less than 16. For example, N may be 1, 2, 4, or 8.

Optionally, during random access, the base value occupies 11 bits, and the offset value occupies 4 bits; or during non-random access, the base value occupies 6 bits, and the offset value occupies 4 bits.

Optionally, during random access, the transmission timing adjustment amount is $N_{TA}$, and $N_{TA}=T_{A\_BASE}*M+T_{A\_OFFSET}*N$, where a unit of $N_{TA}$ is Ts, $T_{A\_BASE}$ is the base value, and $T_{A\_OFFSET}$ is the offset value; or during non-random access, the transmission timing adjustment amount is $N_{TA,new}$, and $N_{TA,new}=N_{TA,old}+(T_{A\_BASE}-m)*M+T_{A\_OFFSET}*N$, where a unit of $N_{TA,new}$ is Ts, $N_{TA,old}$ is a previous transmission timing adjustment amount, $T_{A\_BASE}$ is the base value, $T_{A\_OFFSET}$ is the offset value, m is [a maximum value of $T_{A\_BASE}/2$], and [ ] represents rounding up or rounding down.

Optionally, M is less than 16, N is 0, and the TA quantized value is the base value. For example, M may be 1, 2, 4, or 8.

Optionally, the UE receives the TA quantized value by using a TA command.

Optionally, the processor 121 is further configured to send a measurement report and call information to the base station by using the transmitter 123, so that the base station determines network coverage information and traffic information according to the TA quantized value, the measurement report, and the call information.

It should be noted that the processor 121 herein may be one processor, or may be a general term of multiple processing elements. For example, the processor may be a central processing unit (CPU) or may be an application-specific integrated circuit (ASIC), or may be configured into one or more integrated circuits for implementing this embodiment of the present invention, such as one or more digital signal processors (DSP) or one or more field programmable gate arrays (FPGA).

The memory 122 may be one storage apparatus, or may be a general term of multiple storage elements, and is configured to store executable program code or a parameter, data, and the like that are needed in operation of the user equipment. The memory 122 may include a random access memory (RAM) or may include a non-volatile memory, such as a magnetic disk memory or a flash memory.

The bus 125 may be an industry standard architecture (ISA) bus, a peripheral component interconnect (PCI) bus, an extended industry standard architecture (EISA) bus, or the like. The bus 125 may be classified into an address bus, a data bus, a control bus, and the like. For ease of representation, the bus in FIG. 12 is represented by using only one bold line, but it does not indicate that there is only one bus or only one type of bus.

The UE provided in this embodiment may be configured to execute the technical solutions in the foregoing method embodiments, implementation principles and technical effects thereof are similar, and details are no longer described herein in this embodiment.

In the several embodiments provided in the present application, it should be understood that the disclosed device and method may be implemented in other manners. For example, the foregoing described apparatus embodiment is merely exemplary. For example, the unit or module division is merely logical function division and may be other division in actual implementation. For example, a plurality of units or modules may be combined or integrated into another system, or some features may be ignored or not performed. In addition, the displayed or discussed mutual couplings or direct couplings or communication connections may be implemented through some interfaces. The indirect couplings or communication connections between the devices or modules may be implemented in electronic, mechanical, or other forms.

The modules described as separate parts may or may not be physically separate, and parts displayed as modules may or may not be physical modules, may be located in one position, or may be distributed on a plurality of network units. A part or all of the modules may be selected according to actual needs to achieve the objectives of the solutions of the embodiments.

Persons of ordinary skill in the art may understand that all or a part of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disc, or an optical disc.

Finally, it should be noted that the foregoing embodiments are merely intended for describing the technical solutions of the present invention other than limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A transmission timing adjustment method, comprising:
   sending, by user equipment (UE), a random access preamble to a base station;
   receiving, by the UE, a random access response from the base station, wherein the random access response comprises a first timing advance (TA) quantized value, and a quantity of bits occupied by the first TA quantized value is more than 11, wherein quantization precision of the first TA quantized value is M*Ts, M is a positive integer less than 16, and Ts has a value of 1/30.72 µs;
   determining, by the UE, a first transmission timing adjustment amount according to the first TA quantized value; and
   performing, by the UE, uplink transmission timing adjustment according to the first transmission timing adjustment amount.

2. The method according to claim 1, wherein the first transmission timing adjustment amount is $N_{TA}$, $N_{TA}=T_{A\_BASE}*M$, a unit of $N_{TA}$ is Ts, $T_{A\_BASE}$ is the first TA quantized value.

3. The method according to claim 1, wherein the receiving the random access response comprises:
   receiving a media access control control element (MAC CE) from the base station, wherein the MAC CE comprises the random access response.

4. The method according to claim 1, wherein the quantization precision of the first TA quantized value comprises 1 Ts, 2 Ts, 4 Ts, or 8 Ts.

5. The method according to claim 1, further comprising:
   receiving, by the UE during non-random access, a second TA quantized value from the base station, wherein quantization precision of the second TA quantized value is M*Ts, M is a positive integer less than 16, and Ts has a value of 1/30.72 μs;

determining, by the UE, a second transmission timing adjustment amount according to the second TA quantized value; and performing, by the UE, uplink transmission timing adjustment according to the second transmission timing adjustment amount.

6. The method according to claim 5, wherein the quantization precision of the second TA quantized value comprises 1 Ts, 2 Ts, 4 Ts, or 8 Ts.

7. The method according to claim 5, wherein the second transmission timing adjustment amount is $N_{TA,new}$, $N_{TA,new}=N_{TA,old}+(T_{A\_BASE}\ m)*M$, a unit of $N_{TA,new}$ is Ts, $N_{TA,old}$ is a previous transmission timing adjustment amount, $T_{A\_BASE}$ is the second TA quantized value, m is [a maximum value of $T_{A\_BASE}/2$], and [ ] represents rounding up or rounding down.

8. A transmission timing adjustment method, comprising:
receiving, by a base station, a random access preamble from user equipment (UE), and
sending, by the base station, a random access response to the UE, wherein the random access response comprises a first timing advance (TA) quantized value, and a quantity of bits occupied by the first TA quantized value is more than 11, wherein quantization precision of the first TA quantized value is M*Ts, M is a positive integer less than 16, and Ts has a value of 1/30.72 μs.

9. The method according to claim 8, wherein the sending the random access response to the UE, comprises:
sending a media access control control element (MAC CE) to the UE, wherein the MAC CE comprises the random access response.

10. The method according to claim 8, wherein the quantization precision of the first TA quantized value comprises 1 Ts, 2 Ts, 4 Ts, or 8 Ts.

11. The method according to claim 8, further comprising:
determining, by the base station, a transmission delay between the UE and the base station, and
generating the first TA quantized value according to the transmission delay.

12. The method according to claim 11, wherein the generating the first TA quantized value comprises:
quantizing the transmission delay by using the quantization precision, MTs, to obtain the quantized value of the transmission delay, wherein the quantized value of the transmission delay is the first TA quantized value.

13. The method according to claim 8, further comprising:
sending, by the base station during non-random access, a second TA quantized value to the UE, wherein quantization precision of the second TA quantized value is M*Ts, M is a positive integer less than 16, and Ts has a value of 1/30.72 μs.

14. The method according to claim 13, wherein the quantization precision of the second TA quantized value comprises 1 Ts, 2 Ts, 4 Ts, or 8 Ts.

15. An apparatus, comprising at least one processor and a memory coupled to the at least one processor, when executing programming instructions, the at least one processor being instructed to:
send a random access preamble to a base station;
receive a random access response from the base station, wherein the random access response comprises a first timing advance (TA) quantized value, and a quantity of bits occupied by the first TA quantized value is more than 11, wherein quantization precision of the first TA quantized value is M*Ts, M is a positive integer less than 16, and Ts has a value of 1/30.72 μs;
determine a first transmission timing adjustment amount according to the first TA quantized value; and
perform uplink transmission timing adjustment according to the first transmission timing adjustment amount.

16. The device apparatus according to claim 15, wherein the first transmission timing adjustment amount is $N_{TA}$, $N_{TA}=T_{A\_BASE}*M$, a unit of $N_{TA}$ is Ts, $T_{A\_BASE}$ is the first TA quantized value.

17. The apparatus according to claim 15, wherein when executing programming instructions, the at least one processor being instructed to:
receive a media access control control element (MAC CE) from the base station, wherein the MAC CE comprises the random access response.

18. The apparatus according to claim 15, wherein the quantization precision of the first TA quantized value comprises 1 Ts, 2 Ts, 4 Ts, or 8 Ts.

19. The apparatus according to claim 15, wherein when executing programming instructions, the at least one processor being further instructed to:
receive, during non-random access, a second TA quantized value from the base station, wherein quantization precision of the second TA quantized value is M*Ts, M is a positive integer less than 16, and Ts has a value of 1/30.72 μs;
determine a second transmission timing adjustment amount according to the second TA quantized value; and
perform uplink transmission timing adjustment according to the second transmission timing adjustment amount.

20. The apparatus according to claim 19, wherein the quantization precision of the second TA quantized value comprises 1 Ts, 2 Ts, 4 Ts, or 8 Ts.

21. The apparatus according to claim 19, wherein the second transmission timing adjustment amount is $N_{TA,new}$, $N_{TA,new}=N_{TA,old}+(T_{A\_BASE}\ m)*M$, a unit of $N_{TA,new}$ is Ts, $N_{TA,old}$ is a previous transmission timing adjustment amount, $T_{A\_BASE}$ is the second TA quantized value, m is [a maximum value of $T_{A\_BASE}/2$], and [ ] represents rounding up or rounding down.

22. An apparatus, comprising at least one processor and a memory coupled to the at least one processor, when executing programming instructions, the at least one processor being instructed to:
receive a random access preamble from user equipment (UE), and send a random access response to the UE, wherein the random access response comprises a first timing advance (TA) quantized value, and a quantity of bits occupied by the first TA quantized value is more than 11, wherein quantization precision of the first TA quantized value is M*Ts, M is a positive integer less than 16, and Ts has a value of 1/30.72 μs.

23. The apparatus according to claim 22, when executing programming instructions, the at least one processor being instructed to:
send a media access control control element (MAC CE) to the UE, wherein the MAC CE comprises the random access response.

24. The apparatus according to claim 22, wherein the quantization precision of the first TA quantized value comprises 1 Ts, 2 Ts, 4 Ts, or 8 Ts.

25. The apparatus according to claim 22, when executing programming instructions, the at least one processor being instructed to:

determine a transmission delay between the UE and the apparatus; and generate the first TA quantized value according to the transmission delay.

26. The apparatus according to claim 25, wherein when executing programming instructions, the at least one processor being instructed to:

quantize the transmission delay by using the quantization precision, MTs, to obtain the quantized value of the transmission delay, wherein the quantized value of the transmission delay is the first TA quantized value.

27. The apparatus according to claim 22, wherein when executing programming instructions, the at least one processor being further instructed to:

send, during non-random access, a second TA quantized value to the UE, wherein quantization precision of the second TA quantized value is M*Ts, M is a positive integer less than 16, and Ts has a value of 1/30.72 us.

28. The apparatus according to claim 21, wherein the quantization precision of the second TA quantized value comprises 1 Ts, 2 Ts, 4 Ts, or 8 Ts.

29. A non-transitory computer readable storage medium, wherein the non-transitory computer readable storage medium stores a program which, when the program is executed by at least one processor, the following steps are performed:

sending a random access preamble to a base station;

receiving a random access response from the base station, wherein the random access response comprises a first timing advance (TA) quantized value, and a quantity of bits occupied by the first TA quantized value is more than 11, wherein quantization precision of the first TA quantized value is M*Ts, M is a positive integer less than 16, and Ts has a value of 1/30.72 μs;

determining a first transmission timing adjustment amount according to the first TA quantized value; and performing uplink transmission timing adjustment according to the first transmission timing adjustment amount.

* * * * *